July 19, 1932. T. E. MURRAY ET AL 1,867,706
ELECTRICAL GALLERY AND RELATED PARTS
Filed July 22, 1925 11 Sheets-Sheet 8

Inventors
THOMAS E. MURRAY
ROBERT BAKER
By their Attorney

July 19, 1932.  T. E. MURRAY ET AL  1,867,706
ELECTRICAL GALLERY AND RELATED PARTS
Filed July 22, 1925    11 Sheets-Sheet 10

Inventors
Thomas E. Murray
Robert Baker
By their Attorney
D. Anthony Usina

Patented July 19, 1932

1,867,706

UNITED STATES PATENT OFFICE

THOMAS E. MURRAY, OF BROOKLYN, AND ROBERT BAKER, OF EAST ROCKAWAY, NEW YORK; SAID BAKER ASSIGNOR TO SAID MURRAY; JOSEPH BRADLEY MURRAY, THOMAS E. MURRAY, JR., AND JOHN F. MURRAY, EXECUTORS OF SAID THOMAS E. MURRAY, DECEASED, ASSIGNORS TO METROPOLITAN DEVICE CORPORATION, A CORPORATION OF NEW YORK

ELECTRICAL GALLERY AND RELATED PARTS

Application filed July 22, 1925. Serial No. 45,441.

This invention relates to electrical distribution systems and improvements in switch house construction and aims to provide a compact installation incorporating novel features of design adapted to prevent communication of trouble from different pieces of equipment of the same class or between equipment of different classes.

The invention also aims to provide a switch house structure with equipment so housed therein that each class is accessible only from an individual room or passageway thereby minimizing the danger to workmen from accidental contact with equipment of a different class than that on which they are working.

In the switch house illustrated, improved ventilating means are disclosed which minimize the likelihood of air currents forming a path for the transmission of electric current from one phase to the other or from any of the phases to the ground. The invention is illustrated as applied to a switch house with its main and auxiliary busses connected to the generators of a large central supply station, with group busses tapped from the main and auxiliaries. These group busses in turn have outgoing feeders connected therewith which lead usually to sub-stations or in some instances to large power users such as street railways or other public utility companies. In large cities or industrial centers it is frequently the practice to centralize the power generating units. This results in concentrating gigantic sources of power at such stations and utmost care must be exercised to prevent accident such as inter-phase short circuits or short circuits from different supply phases to ground.

Our invention aims to provide a distribution system where the safety factor is extremely large. As far as possible, we isolate the different phases from one another preferably on separate floors of a building. The various classes of equipment used on each phase are further grouped together in such a way that each group is only accessible from a given room or passage in order to prevent communication of trouble from one group to the other.

In addition to the features outlined above in a general way our improved distribution system and switch house construction includes various other novel features which will be apparent from the following specification when read in connection with the accompanying drawings illustrating embodiments thereof in which

Fig. 13 is a view in horizontal section showing a further modification in the layout of the switch house.

According to our improved system of distribution each phase and switching equipment associated therewith is located on a separate floor or equivalent sub-division of a building forming part of the power station which building will hereinafter be called the switch house.

Our improved layout is illustrated in connection with a three phase system but, of course, we are not limited to any particular number of phases, a three phase system being chosen, however, for the purpose of illustration as it corresponds to the generally accepted practice in modern stations.

Figure 1:
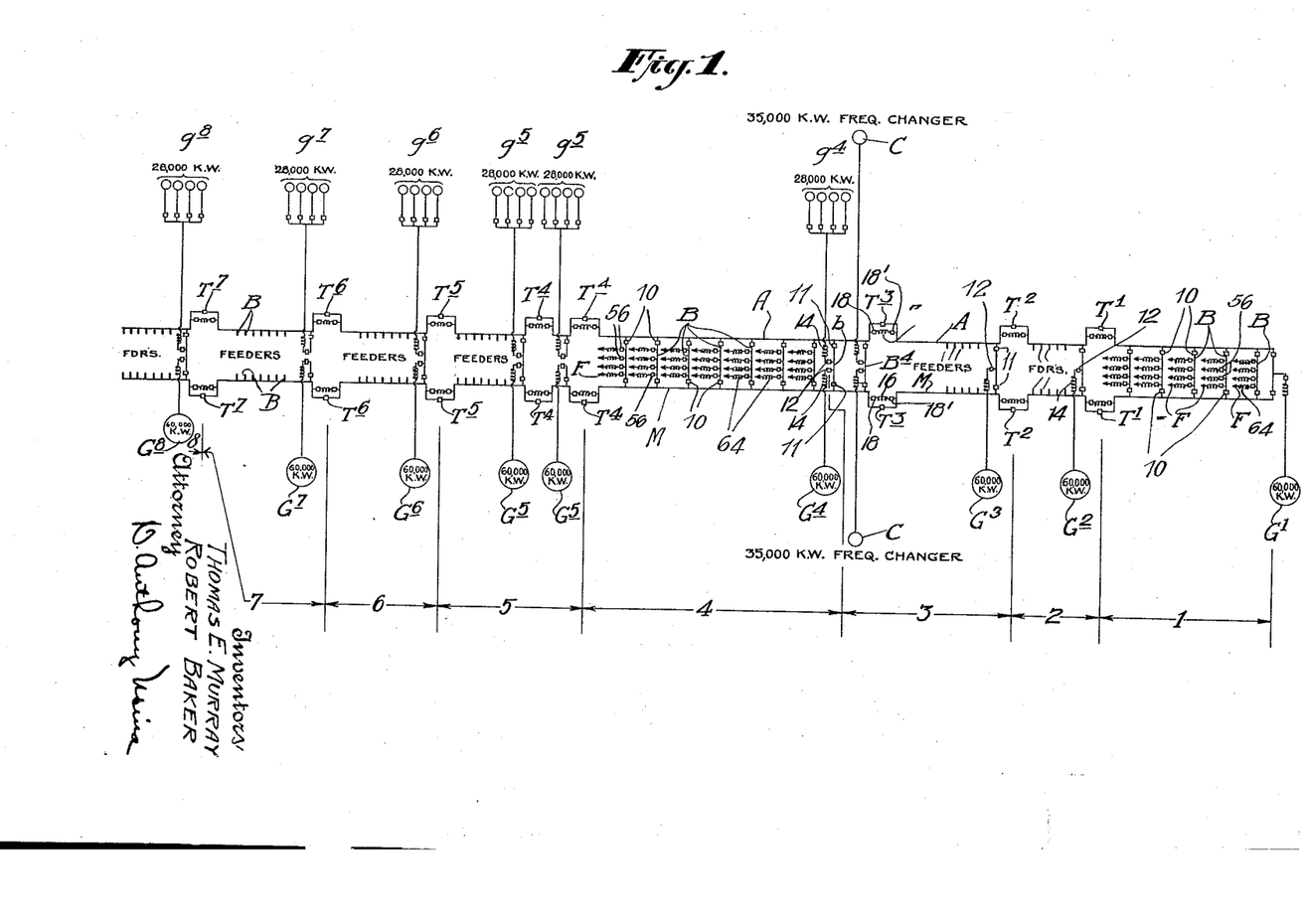
Fig. 1 is a somewhat diagrammatic circuit layout of one phase of a distribution system embodying the invention.

Fig. 1 illustrates one phase of a distribution system and this arrangement may be considered as repeated on each of the three floors of the switch house hereinafter more fully described with the exception, of course, that the generators shown diagrammatically are not duplicated on the different floors.

The bus layout for each phase is arranged in duplicate and the equipment therefore is provided in duplicate so that in the event of failure of any given unit the same can be cut out from one bus and similar pieces of equipment cut in on an auxiliary bus or on the other hand the faulty equipments can be cut out of service all together without effecting the other equipment. In the drawings, we have illustrated what we term a main supply bus M and an auxiliary supply bus A. These two constitute the main supply lines from the generators. The busses M and A are divided into different longitudinal sections. Each of these sections are tied to one another electrically by bus tie switches indicated at $T^1$, $T^2$, $T^3$ and so on, on the main and auxiliary busses as shown. Each of the longitudinal bus sections is served by one or more generators as indicated at $G^1$, $G^2$, $G^3$ and so on.

The main or auxiliary busses M and A, respectively, are arranged to serve a multiplicity of group busses B which can be selectively connected either with the main or auxiliary busses by means of group bus selector switches 10 hereinafter more fully referred to. Each longitudinal section of the main bus serves a plurality of group busses and each group bus in turn serves a plurality of feeders leading out to sub-stations or large power consumers. Hence, it will be seen that each longitudinal section of the main bus (or alternatively the auxiliary bus) serves a great number of outgoing feeders. The feeders are indicated diagrammatically at F in Fig. 1. Each is provided with switching equipment controlling its communication with the group bus and suitable current limiting reactors hereafter referred to are included in circuit with each line feeder.

In Fig. 1, we have illustrated diagrammatically only four feeders connected with each group bus B. In actual practice, however, the feeders are arranged as shown better in Fig. 2, there being a set of four feeders for each group bus on one side of the building and four feeders also connected to the group bus on the other side of the building.

Supply to any longitudinal section of either the main bus or auxiliary bus from the generators $G^1$, $G^2$ and so on is controlled by a generator selector switch 11 which is in series with a generator reactor 14, the latter being connected to the generator as indicated diagrammatically in Fig. 1.

The longitudinal supply bus sections as indicated by the dimensions 1, 2, 3, 4 and so on may be of varying lengths and may be added as the power demand in the particular community served increases. In section 1 we have shown a generator $G^1$ serving the five group busses on the main and auxiliary busses.

The second section located between bus tie switches $T^1$ and $T^2$ is served by generator $G^2$, the third section located between the bus ties $T^2$ and $T^3$ is served by a generator $G^3$, the fourth, fifth, sixth, seventh and eighth sections are similarly served by generators $G^4$, $G^5$ and $G^6$ and so on.

The several longitudinal sections numbered from 1 to 8 inclusive are somewhat similar in arrangement and a detailed description of one will suffice for all. For the purpose of this description, we have illustrated a portion of the switch house in detail for housing the equipment such as illustrated in section 4 of Fig. 1. It is noted that this section includes in addition to the generator $G^4$ another group of generators indicated at $g^4$ which are capable of supplying approximately 28,000 k. w. They are adapted to be driven by suitable turbines such as the mercury type.

Sections 5, 6, 7 and 8 are served respectively by generators $G^5$, $G^6$, $G^7$ and $G^8$. These sections are also provided with generator sets $g^5$, $g^6$, $g^7$ and $g^8$. Each of these sections is provided with several group busses B the same number as shown in section 4. Line feeders such as those indicated at F in section 4, reactance switches and other equipment will also be provided in these sections but the latter has been omitted in the interest of simplification of illustration. The feeder equipment has also been omitted from sections 2 and 3 for the same reason.

The switch house construction and the novel physical arrangement and the disposition of the various pieces of equipment is illustrated in detail in Figs. 2 to 11 inclusive. Inasmuch as we have illustrated what is practically an intermediate portion of an installation, this description will start from the bus tie switches $T^3$ $T^3$ which hook up the main and auxiliary busses M and A of section 4 to the portions of said busses at the left in section 3 of Fig. 1. The equipment for effecting this hook-up includes the bus tie switches $T^3$ and bus tie reactors 16. These parts being arranged in duplicate on the main and auxiliary busses. The generators $G^4$ and $g^4$ may be connected to either the main or auxiliary busses M and A, through generator reactors 14, 14 and generator reactance switches 12 are interposed between the reactors 14 and the cross bus b, the latter being connected with the main and auxiliary busses through the above mentioned generator selector switches 11.

The bus tie reactors 16 are connected to the main auxiliary busses through bus tie reactance switches 18, 18'. It is desirable to segregate the different classes of equipment and to isolate them from one another so as to prevent communication of trouble from equipment of one group to that of another group. It will be appreciated that the bus tie equipment together with its reactors, circuit breakers, oil switches, and so on, is a critical point in the installation and it is advantageous that an operator be able to readily inspect this entire equipment very quickly yet the different parts thereof should be sufficiently separated to insure a high factor of safety. To these ends I group the several switches and circuit breakers in what I term a transverse room. This room is provided with a multiplicity of compartments for housing several switches, circuit breakers and the like. The reactors connected to the bus tie and generator switches, respectively, are physically separated from this equipment by a transverse partition and the same are located in compartments which are accessible from a different room or passage which is physically isolated from the switching equipment. As is clearly shown in plan in Fig. 2 and in elevation in Fig. 8, the generator oil switch 12, bus tie reactance oil switch 18, bus tie switch T³ and bus tie reactance switch 18' are located in compartments 20, 22, 24 and 26 respectively which open on and are accessible only from the transversely extending room 28 which opens on longitudinally extending passageways 30 located adjacent the outer side walls 32 of the switch house.

Figure 8:
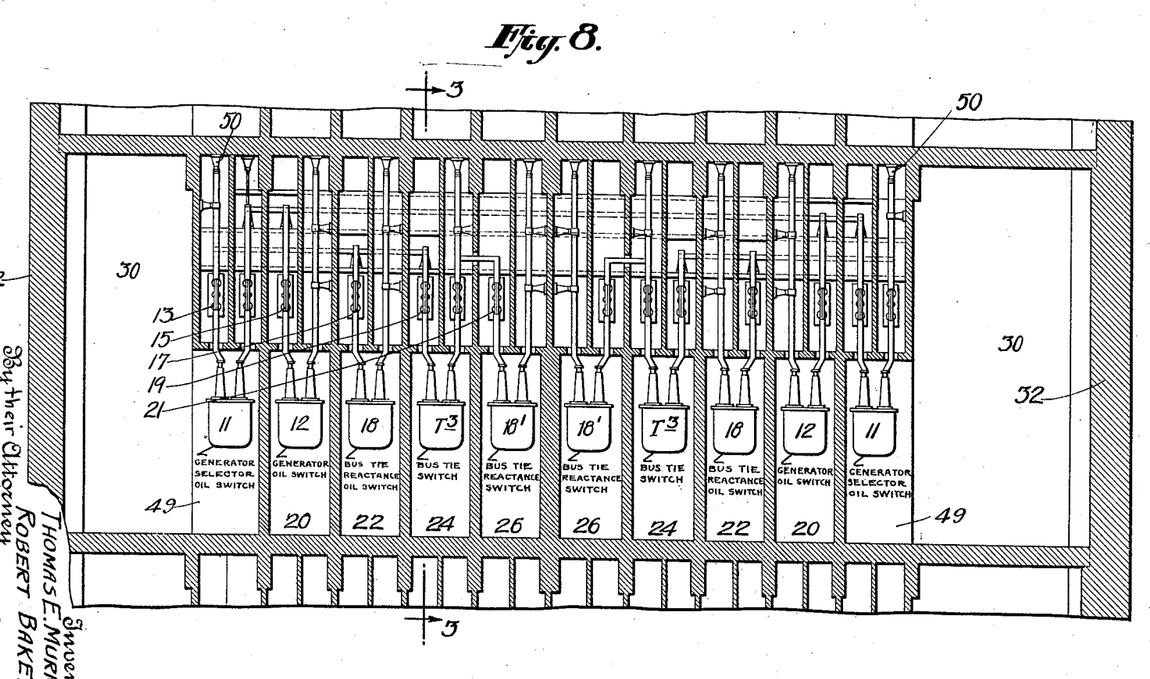
Fig. 8 is a transverse section on line 8—8 of Fig. 2, this figure being also at the same scale as Figures 5 to 7.
Figure 9:
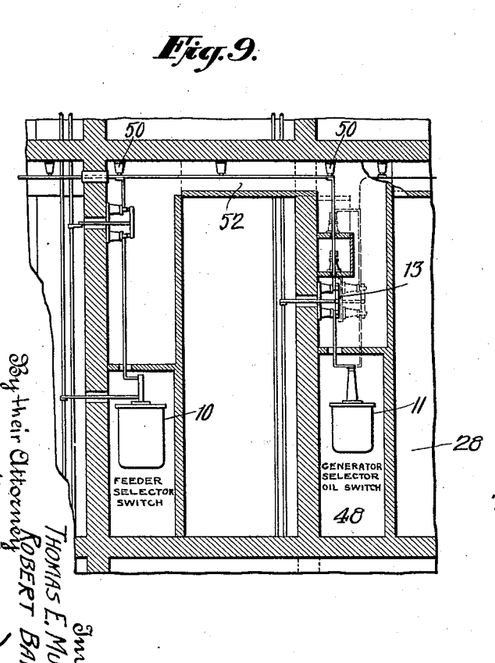
Figs. 9, 10 and 11 are detail sections on the correspondingly numbered section lines of Fig. 6.

The various oil switches 11, 12, 18, T³ and T³' shown in Fig. 8 are known types of oil switches and are connected with suitable disconnect switches 13, 15, 17, 19 and 21, said disconnects in turn being connected with the supply busses and various branch busses and being adapted to be operated so as to break the circuit connections to the respective oil switches so as to minimize the danger of short circuits or danger to workmen when making repairs. The branch busses connected with the disconnects pass through suitable conduits extending transversely of the switch building and these disconnect switches are each located in separate compartments as illustrated best in Fig. 8. The showing of the disconnect switches is omitted from the circuit diagram, Fig. 1, and from the diagrammatic physical and electrical plan of Fig. 2 in the interest of clearness.

The passageway 30 extends for practically the full length of the building and serves as a main artery of travel for workmen. The main and auxiliary busses follow these passageways and the group busses B branch therefrom at different intervals, the latter passing through different transverse rooms provided with compartments more fully referred to which house the distribution equipment for the outgoing feeders.

To resume the description of the bus tie and related switching equipment at this critical point, it is noted that the room 28 includes all of the bus tie switching apparatus yet each piece of apparatus is isolated from its neighbor by a physical wall. It is further noted that the reactors 14 and 16 are separated from their switching equipment by a cross partition wall 34 and that said reactors are located in individual compartments 36 and 38 shown in detail in Fig. 7.

The reactors 14 are connected with current transformers 40 in compartments 42 which are located above the compartments 36. Potential transformers 44 and 46 are located in compartments 48 and 50 adjacent the compartments 42. The generator selector oil switches 11, it will be noted, forms part of the critical group associated with the bus tie equipment but the same is effectively isolated therefrom and accessible only from the passages 30, these oil switches being walled in or housed in compartments 49 which open on the passageways 30. This ensures against communication of short circuits between the bus tie equipment and the generator selector equipment.

The main and auxiliary busses M and A extend longitudinally from the room 28 along the passageways 30. The busses are in the form of heavy conductors supported by suitable insulators 50 designed to prevent current leakage from high potential conductors. Conduits or ducts 52 are formed in the switch house and extend longitudinally thereof and follow the general direction of the longitudinal passageways 30. These ducts serve to partly enclose the main and auxiliary busses and act as barriers to protect against short circuiting arcs.

The equipment for controlling the outgoing current is segregated in different groups. The different groups are preferably accessible only from a particular room or passage. Each group of equipment is associated with a particular group bus and this can be selectively connected with or disconnected from the main or auxiliary bus by means of respective oil bus selector switches 10 which are located in compartments 54 opening on and accessible only from the passageways 30.

Figure 2:
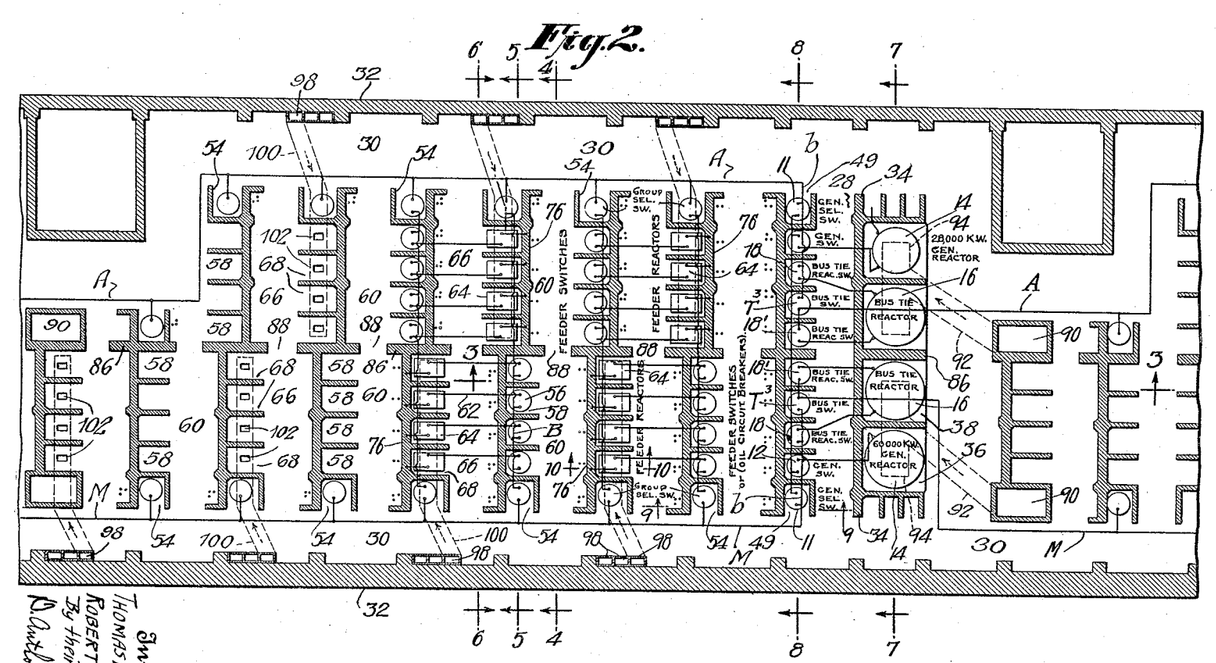
Fig. 2 is a horizontal section through a switch house showing the disposition of certain main and auxiliary bus equipment connected to but physically isolated therefrom.
Figure 3:
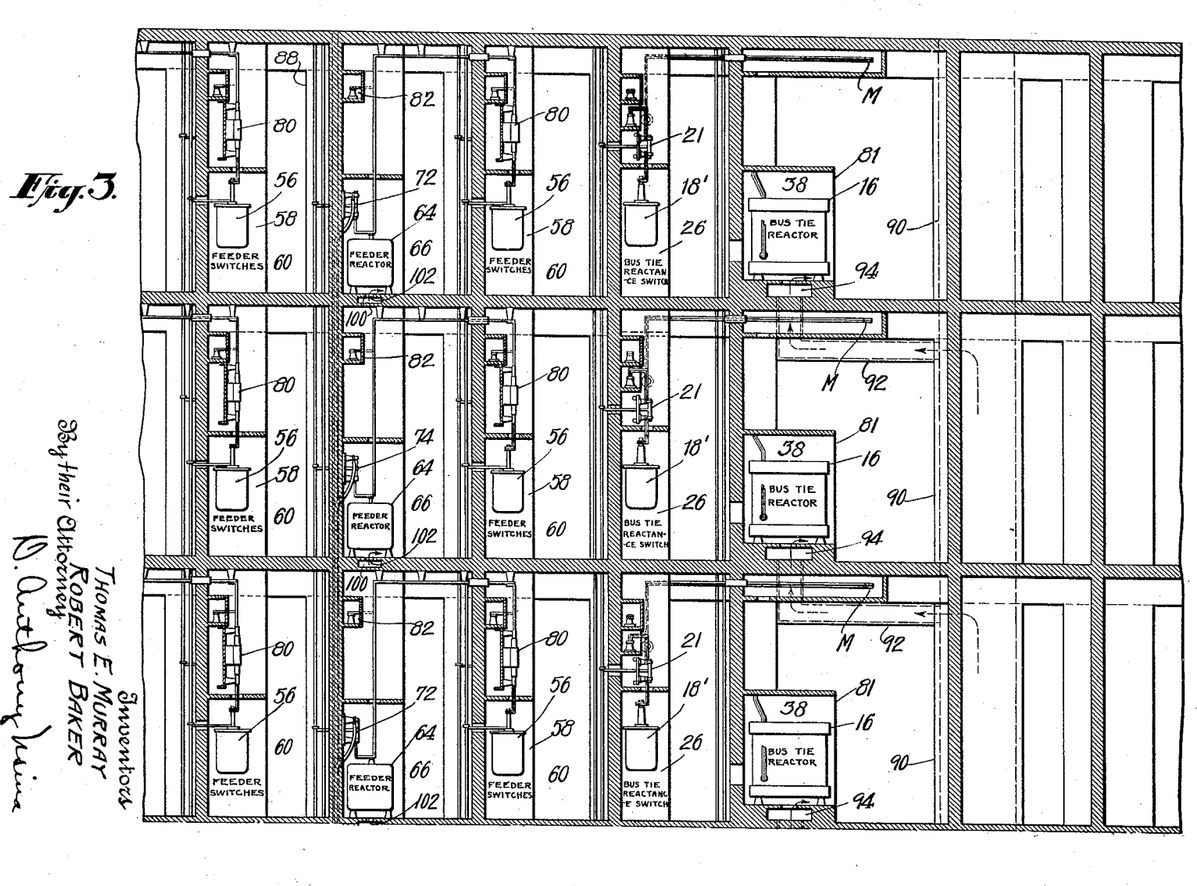
Fig. 3 is a longitudinal vertical section on line 3—3 of Fig. 2 showing three separate floors of a switch house which are adapted to accommodate substantially the same kind of equipment associated with each phase of a three phase distribution system.

The segregated feeder distribution equipment is shown at the left of the bus tie equipment in Fig. 2. Generally speaking, this feeder equipment includes a great number of duplicate switches controlling the outgo of current through line feeders, said current passing through current limiting reactors. Like the bus tie equipment, the feeder equipment is also arranged in duplicate.

Figure 4:
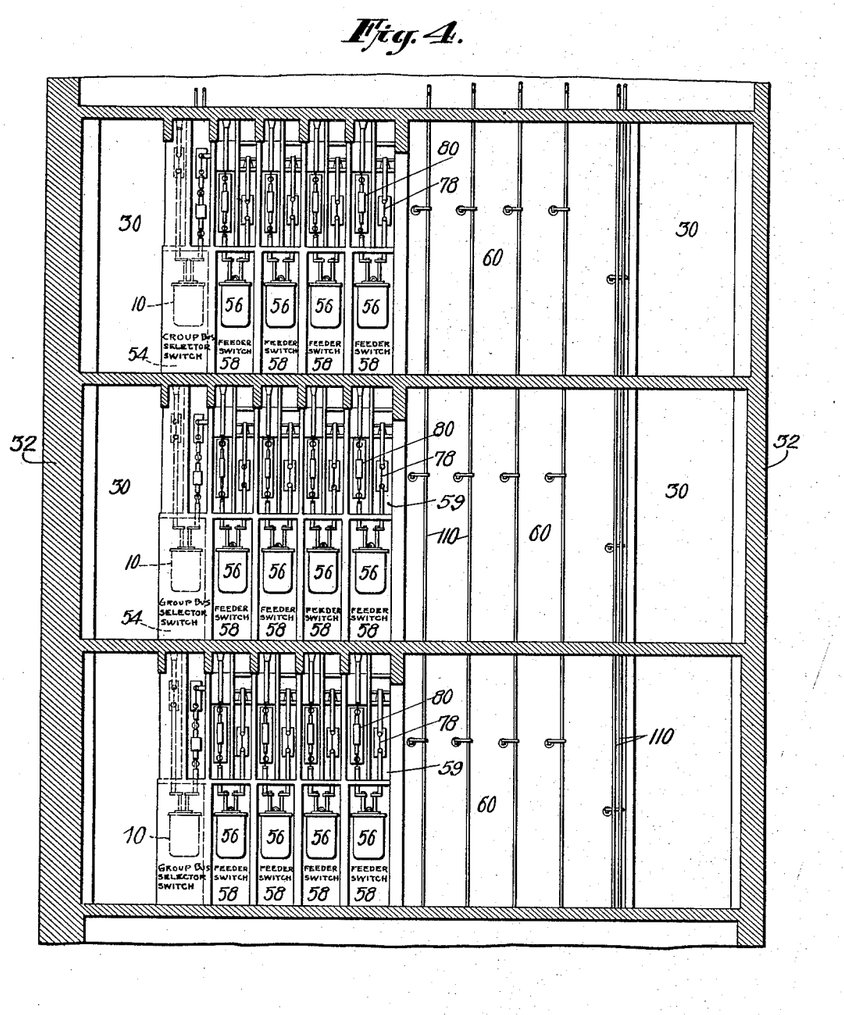
Fig. 4 is a transverse section on line 4—4 of Fig. 2.
Figure 5:
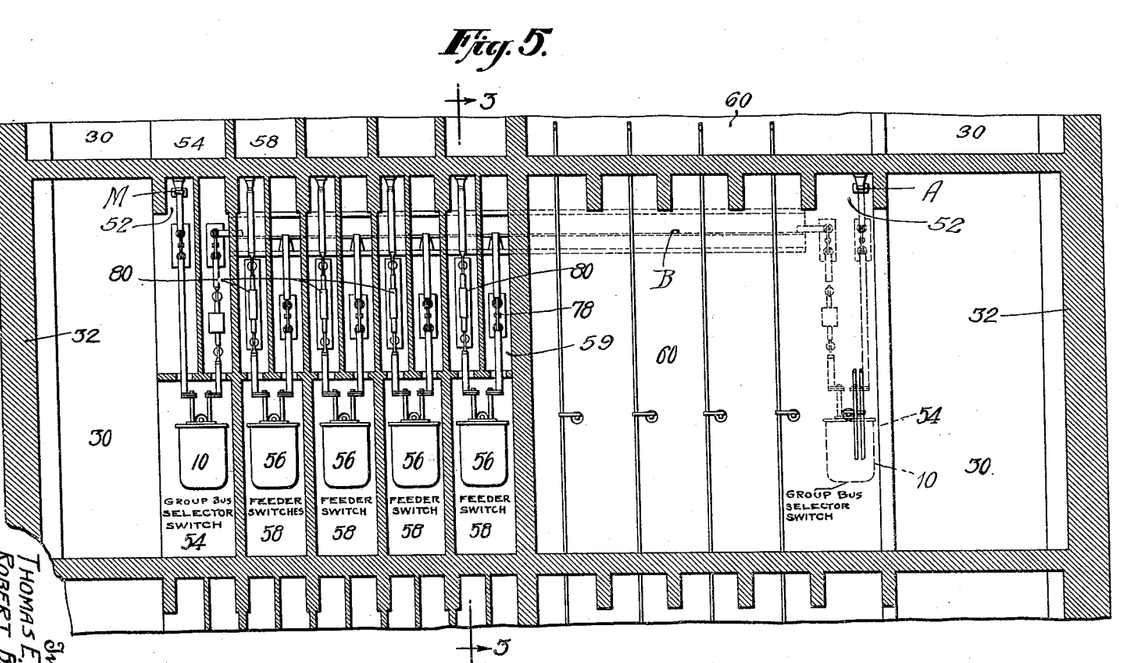
Fig. 5 is an enlarged view showing the equipment on one of the floors illustrated in Fig. 4.
Figure 6:
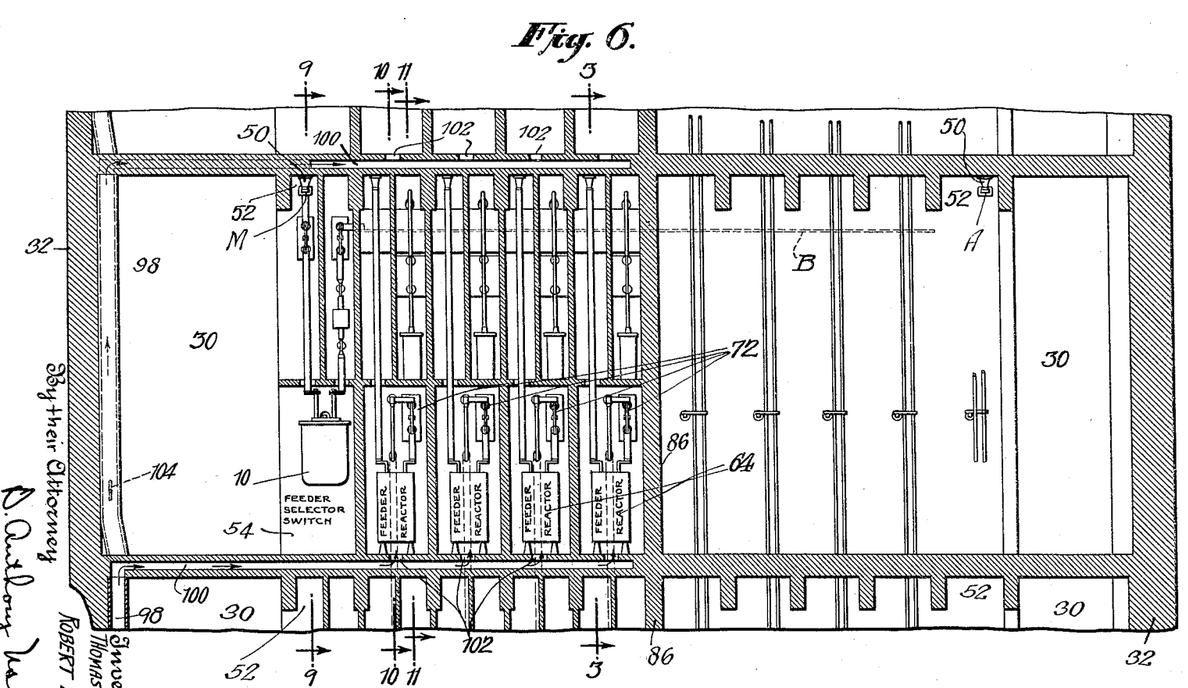
Fig. 6 is a transverse section on line 6—6 of Fig. 2, the view being on a larger scale.
Figure 7:
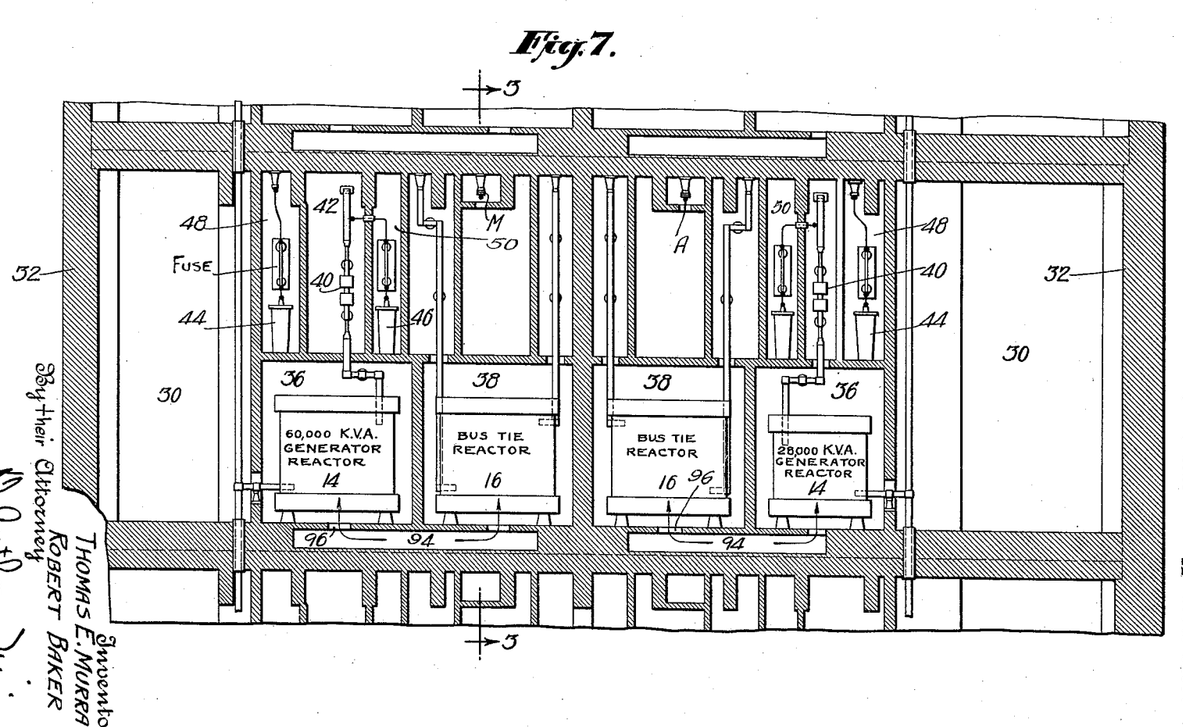
Fig. 7 is an enlarged transverse section on line 7—7 of Fig. 2, the scale of the drawing being substantially the same as that of Figs. 5 and 6.

Figs. 4, 5 and 6 are vertical cross-sections on the correspondingly numbered lines of Fig. 2 showing details of the feeding equipment and the manner in which the different pieces of equipment are isolated from one another so as to prevent the communication of trouble due to short circuiting or otherwise between the different pieces of apparatus.

Figure 10:
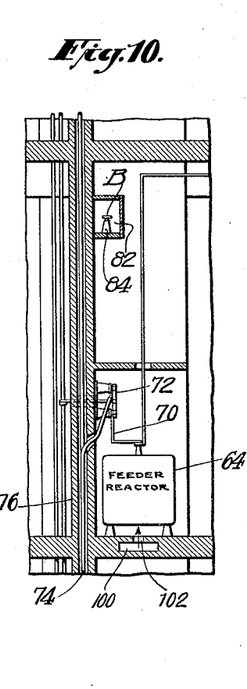
Figure 11:
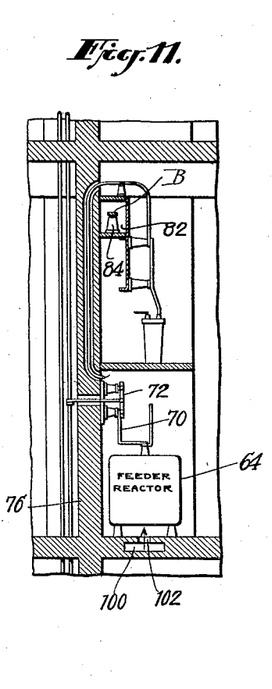

Each group of feeders is connected with a group bus B and the supply of current thereto from either the main or auxiliary bus is controlled by the group bus selector switch 10 above referred to. Branch conductors from each group bus B are connected with feeder oil switches 56. Each oil switch is located in a separate compartment 58 accessible only from a room 60 opening on the passages 30 and extending substantially at right angles thereto. Each feeder switch is connected by a suitable conductor 62 with a feeder reactor 64 located in an adjacent room 66, each reactor being housed in a suitable compartment 68 opening on and accessible only from the room 66. Leading out from each reactor 64 is a conductor 70 which, as shown in Fig. 10, is connected with a suitable disconnect switch 72 which connects with the outgoing conductor 74 passing down through a suitable conduit formed in one of the transverse partition walls 76, and thence passing out to a transmission line leading to a sub-station or power consumer.

The feeder oil switches like the feeder reactors are connected with disconnect switches 78 by means of which the supply of current to said oil switches may be cut off. These disconnect switches are located in separate compartments 59 above the compartments 58 which house the oil switches. Similar compartments are provided to house current transformers 80 associated with each feeder. The transversely extending group busses B are housed in suitable conduits such as indicated at 82 in Figs. 10 and 11 and said busses are supported on suitable high tension insulators 84. As will be apparent from examination of Fig. 2, the feeder reactances 64 are located in the alternate rooms designated by numeral 66 and the feeder oil switches controlling the outgo of current to the sub-station or power users are located in the adjacent rooms designated by numeral 60. As thus arranged, it is clear that each alternate room carries similar feeding equipment. The transverse walls of the rooms are offset with respect to the similar walls of the rooms on the side occupied by the auxiliary busses. And the equipment is so arranged that the front of the oil switches on the main supply bus side is practically in line with the rear of the reactors on the auxiliary bus side. This arrangement permits group busses to be run through in a straight line and provides a desirable conductor layout enabling the use of extremely short tap connections between the group busses and the different pieces of distribution equipment such as reactors, oil switches, disconnect switches, potential transformers, and so on, associated with each group bus.

The rooms 60 and 66, respectively, on the main bus side are partly separated from the rooms 60 and 66 on the auxiliary bus side by a longitudinally extending partition wall 86 which extends practically the entire length of the switch house building, this wall, however, being provided with doorways 88 to permit the passage of workmen from one room to another. In some cases these doorways will be provided with fire doors which can be automatically closed in the event of trouble in the different rooms.

In the physical layout of the apparatus shown in Figs. 2 to 11 inclusive, it is noted that only one side of each partition wall is utilized to house the electrical equipment. Hence, there is a blank wall opposite each group of equipment. This arrangement has advantages over other layouts in which the equipment in a given room is mounted along the opposite walls, for example, as illustrated in Fig. 12.

In large stations distributing an enormous amount of energy such as is handled by the switch house equipment herein shown and described, considerable heat is given off by the different pieces of apparatus and particularly by the current limiting reactors forming part of the generator, bus tie and feed distribution equipment. It is, therefore, highly desirable to provide means for carrying off this heat. Inasmuch as air currents may carry conducting vapors or gases which form paths for the transmission of current of such high tension as that handled in installations of this class, it is necessary to give this problem consideration in laying out the ventilating system for such a switch house and the fire hazard must also be taken into account. The ventilation system shown and to be presently described, meets the requirements peculiar to switch house construction and is laid out particularly with the view of preventing the air conduits themselves or the air or gas flowing therein from forming a vehicle for the transmission of short circuits.

To these ends, we supply the air for each group of equipment, preferably, from a separate supply duct. For example, in Fig. 2, we have shown separate vertical flues 90 for the respective main and auxiliary bus equipment. Each of these flues is connected by a branch 92 with a transversely extending conduit 94 located below the corresponding bus tie and generator reactors 16 and 14. Suitable openings 96 are formed in the floors below these reactors and the air which is under slight pressure from a suitable ventilator fan located at a remote point such as in the basement of the building, circulates around the equipment and cools the same, the heated air rising and passing out either through windows or suitable vent openings not shown formed in the partition walls. Each group of feeder reactors 64 located in the room 66 are cooled in a similar manner by air which is forced through the vertical ducts 98 extending upwardly along the side walls of the building these ducts communicating with horizontal passages 100 the air escaping beneath the reactors 64 through openings 102 as best shown in Fig. 6. It is noted that there are three air ducts opposite each room 66 illustrated in Fig. 2. A separate duct carries the air to each of the three floors of the switch house. It will be remembered that each phase and the various pieces of equipment associated therewith are located on a separate floor of the switch house so as to preclude the possibility of interphase short circuiting. The provision of separate ducts for supplying the ventilating air to each floor is for the purpose of isolating the ventilating air used for cooling the equipment of each phase, thus it is apparent that the air currents cannot be used as vehicles for the communication of electrical disturbances between the phases. This separate distribution also cuts down the fire hazard and suitable dampers such as that indicated at 104 may be provided at convenient locations so that in the event of fire or other disturbance the air ducts may be closed. Of course, the entire air blowing equipment can be shut down but it is desirable to be able to cut off selected parts of the ventilating equipment so that the electrical troubles in a plant of this kind as well as fire troubles can be localized without affecting the more remote pieces of apparatus.

Figure 12:
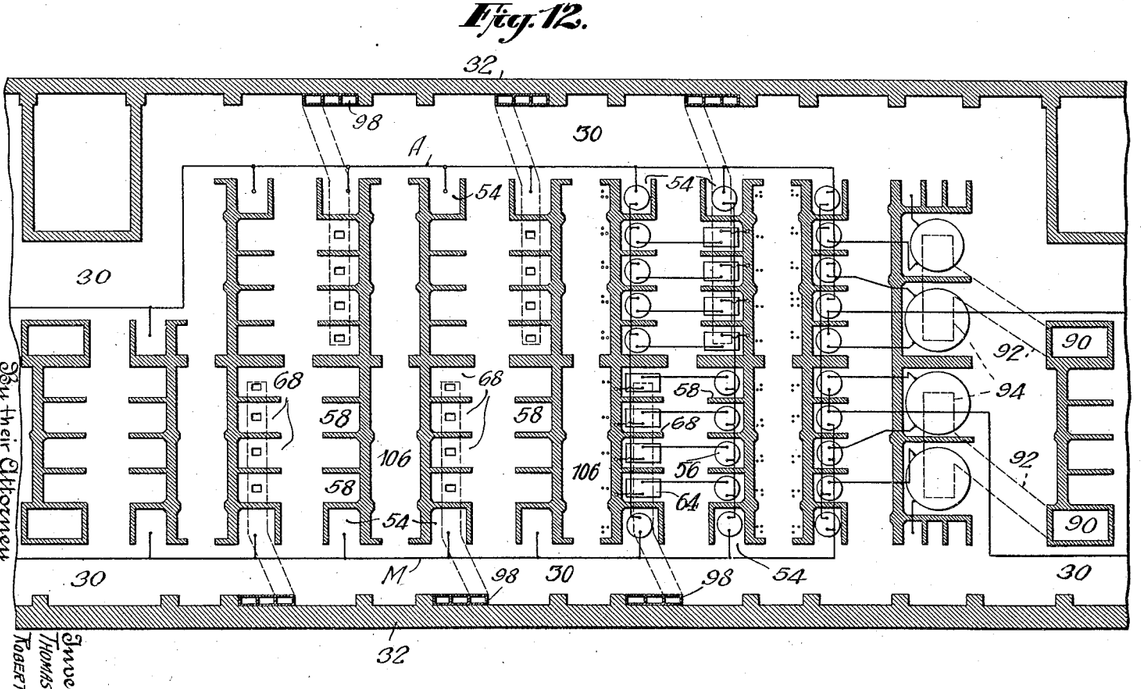
Fig. 12 is a horizontal section somewhat similar to Fig. 2 but illustrating a slightly modified arrangement of the distribution equipment and switch house partition walls.
Figure 15:
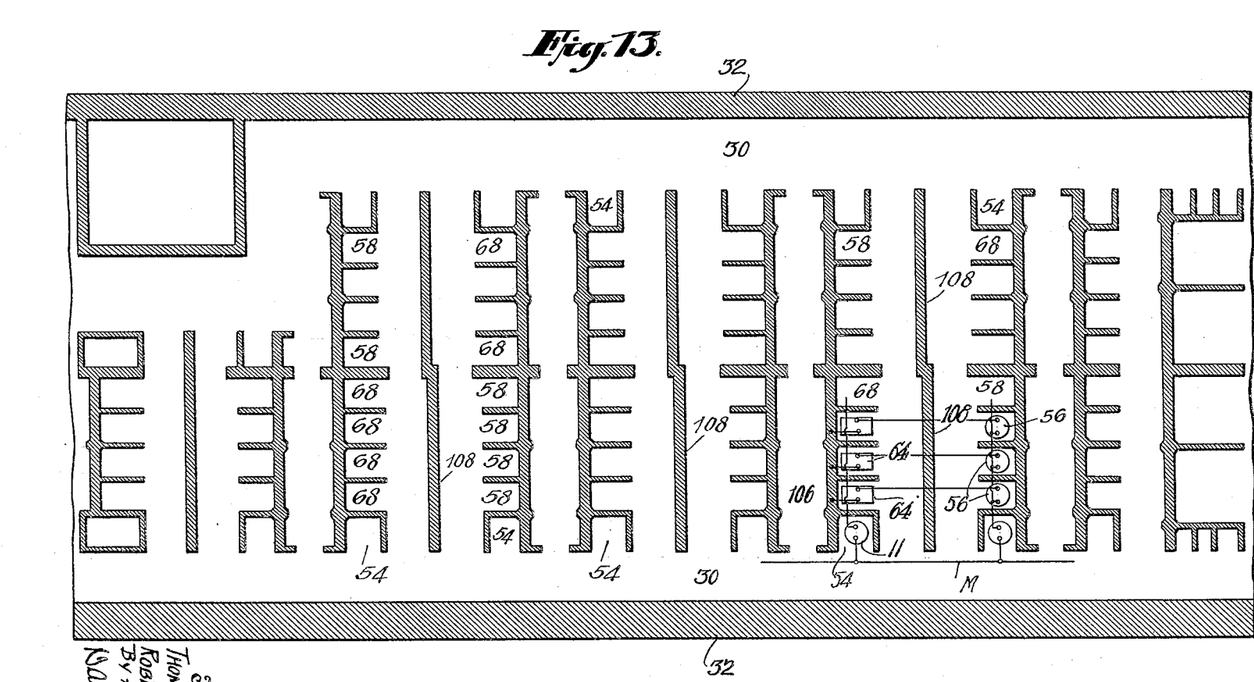

Fig. 12 illustrates an alternative switch house layout. The current distribution is substantially the same as that above described and illustrated, the chief distinction being in the physical grouping and arrangement of the different pieces of apparatus with respect to the partition walls of the switch house building. It will be noted that the feeder reactors 64 and feeder switches 56 are grouped together in the same room as distinguished from the arrangement in Fig. 2 wherein the different classes of equipment occupy separate rooms isolated from one another. In the arrangement shown in Fig. 12 all the equipment for each feeder group is contained in a single room, and these rooms are separated from one another by transversely extending passageways 106. This layout provides avenues of communication between the longitudinal passageways 30. These cross passages do not house any electrical equipment and, hence, can be traversed without any fear of danger in the event of electrical disturbances in equipment.

Fig. 13 illustrates a further modified layout arrangement in which cross passages 106 like those shown in Fig. 12 are provided but the rooms for housing the feeder distribution equipment such as reactors 64 and oil switches 56, are divided by means of transverse partition walls 108 so as to physically isolate the one class of equipment from the other.

In the foregoing description, I have referred in detail to the various pieces of equipment for tying the busses together and supplying current thereto from separate generators for distributing the current from the main or auxiliary busses through line feeders to outside sources. This detail description has been made principally in connection with one phase of a polyphase system of distribution. It is to be understood that duplicate equipment is provided for each phase and in the case of a three phase distribution system there will be three sets of equipment such as shown, for example, in Fig. 2 each of said sets of equipment being located substantially one over the other in the different floors of a switch house building as indicated in the longitudinal and transverse sectional views, Fig. 3 and Fig. 4 respectfully. The vertically aligned switches for the three phases can be operated simultaneously by suitable mechanism located preferably in the top of the building, the power being transmitted through vertically disposed rods indicated at 110. The mechanism for operating these rods and their connection with the different pieces of apparatus are not specifically shown and described as they form no part of our invention and they relate to a certain well known type of electrical apparatus which can be purchased from manufacturers of electrical equipment.

Though we have described with great particularity the layout herein illustrated and certain specific ways of grouping different pieces of apparatus, it is not to be construed that we are limited to such arrangements as various modifications may be made within the scope of the subjoined claims without departing from the spirit of the invention.

What we claim is:—

1. In an electrical distribution system duplicate busses constituting one phase of a main and an auxiliary supply, group busses connected to said main and auxiliary busses and distribution equipment operatively associated with the group busses extending substantially at right angles between the main and auxiliary supply busses.

2. In an electrical distribution system duplicate busses constituting one phase of a main and an auxiliary supply, group busses connected to said main and auxiliary busses and distribution equipment operatively associated with the group busses extending perpendicular to the main and auxiliary supply busses, and selector switches connecting said main and auxiliary supply with said group busses and means for isolating the group bus equipment from said selector switches.

3. In an electrical distribution system a plurality of main busses, means for completely enclosing a main bus for each phase at a different remote elevation, a multiplicity of group busses connected to and extending transversely of each of said main busses, distribution equipment comprising a plurality of control devices associated with each group bus disposed perpendicular of the main busses and means for isolating the equipment of said group busses.

4. In an electrical distribution system a plurality of main busses, separate means remote from one another for housing a main bus for each phase at a different elevation, a multiplicity of group busses connected to and extending transversely of each of said main busses, distribution equipment associated with each group bus disposed at right angles to the main buses, means for isolating the equipment of one bus from that of another, and means for isolating the several pieces of equipment of a given group bus from one another.

5. A switch house of the character described having duplicate busses serving respectively as a main and auxiliary supply, passageways on the opposite sides of the building extending lengthwise thereof, said busses being supported adjacent to and extending in the same direction as said passageways and switching equipment connected to said busses which is accessible only from the widely separated passageways, whereby an adequate safety factor is provided so as to prevent the communication of trouble from one bus to the other.

6. A switch house having a supply bus, extending lengthwise thereof, a passageway following the direction of said bus, compartments accessible only from said passageway for housing switches connected with said bus, a multiplicity of rooms communicating with and extending transversely from said longitudinal passageway, a multiplicity of group busses extending transversely of said supply bus, switching equipment connected with each group bus and compartments accessible only from said rooms for housing the latter equipment whereby the group bus equipment and the supply bus equipment are physically isolated so as to prevent communication of trouble from one to the other.

7. A switch house having longitudinal passageways extending along the side walls thereof, duplicate busses forming a main and an auxiliary supply one extending along each passageway, compartments accessible only from said passageways, respective switches therein connected with each of said busses, group busses extending transversely from said switches, rooms between said passageways providing a multiplicity of avenues of communication therebetween, compartments accessible only from said rooms for housing switching equipment connected to said group busses, whereby the latter equipment is physically isolated from the equipment connected to the main or auxiliary busses.

8. A switch house having longitudinal passageways extending along the side walls thereof, duplicate busses forming a main and an auxiliary supply one extending along each passageway, compartments accessible only from said passageways, a selector switch in each compartment connected with the bus adjacent thereto, group busses extending transversely of the main and auxiliary bus, rooms extending transversely of and communicating with said longitudinal passageways, said group busses passing through said rooms, compartments in the latter for isolating the feeder equipment connected to said group busses from the equipment connected with the main or auxiliary busses.

9. A switch house having longitudinal passageways extending along the side walls thereof, duplicate busses forming a main and an auxiliary supply one extending along each passageway, compartments accessible only from said passageways, a selector switch in each compartment connected with the bus adjacent thereto, group busses extending transversely of the main and auxiliary bus, rooms extending transversely of and communicating with said longitudinal passageways, said group busses passing through said rooms, compartments accessible only from said rooms, feeder switches and feeder reactors located in said compartments and thereby isolated from the equipment connected to either the main or the auxiliary bus.

10. A switch house having a longitudinally extending passage adjacent the outer walls thereof, a main supply bus having switch equipment accessible only from said passageway, walls extending transversely from the latter and defining rooms which communicate therewith, feeder distribution equipment located in said rooms, the latter being partially enclosed in compartments and being accessible only from said rooms so as to physically isolate the different classes of equipment from one another.

11. A switch house of the character described having at least one passageway constituting a main artery of travel extending lengthwise of the building and a series of rooms opening on and extending substantially at right angles thereto, a main supply but extending along said passageway, group busses passing through said rooms and arranged to be selectively connected with said supply bus, feeder switching equipment located in compartments formed in said rooms, said switches being connected with the group busses.

12. A switch house of the character described having a passageway constituting a main artery of travel extending lengthwise of the building, a main supply bus extending along said passageway, a series of spaced walls extending transversely from said passageway defining transversely extending rooms, group busses extending through the latter, compartments adjacent one wall of each of said rooms for housing distribution equipment connected to each group bus, the wall opposite said compartments being blank.

13. In a switch house of the character described a main passageway extending lengthwise thereof, partition walls extending transversely thereof, a main supply bus extending along said passageway, a separate group bus extending along each of said transverse walls, similar distribution equipment located adjacent each alternate partition wall and connected with the group bus extending therealong.

14. A switch house having a longitudinal passageway extending along an outer wall thereof, transverse partition walls forming rooms opening on said passageway, a main supply bus extending along the latter, group busses operatively connected thereto and passing through said rooms, feeder switches connected with group busses passing through each alternate room, feeder reactors located in alternate rooms adjacent those containing said feeder switches whereby the different groups of equipment are physically isolated from one another.

15. A switch house of the character described having passageways extending longitudinally thereof on opposite sides of the building, a multiplicity of transversely extending rooms opening on said passageways, main supply busses and group busses, distribution equipment associated with the latter and arranged so that each class thereof is arranged in groups accessible from its own particular room thereby minimizing danger to workmen from accidental contact with equipment of a different class than that on which they are working.

16. A switch house having electrical distribution equipment therein which is segregated in a multiplicity of different groups and individual ventilation ducts associated with each group of equipment whereby the ventilation for a selected group can be cut off from other groups.

17. In a switch house having a multiplicity of rooms therein for housing individual groups of electrical distribution equipment and separate means for ventilating said groups individually.

18. A switch house of the character described having passageways on the opposite sides of the building extending lengthwise thereof, transverse partition walls between said passages, compartments adjacent said walls for housing electrical distribution equipment, said equipment being arranged in individual groups in separate rooms so as to isolate different classes of equipment from one another and thereby minimize the communication of trouble from one class to another, said walls, passages and compartments being so arranged that a multiplicity of avenues of escape are provided for workmen in case of danger with a minimum of unused space for passageways.

19. In a switch house of the character described main distribution busses arranged on different floors of the building each floor being devoted to equipment of the same phase, separate ducts for ventilating each floor so as to prevent air currents from transmitting currents from one phase to another.

20. An electrical distribution system including longitudinally extending main supply busses divided into separate longitudinal sections which are connected at spaced intervals, generators for supplying current to each section, bus tie switches controlling the communication between different sections of said longitudinal bus, bus tie reactors and switches for including the latter in circuit with said busses, and a multiplicity of group busses with distribution equipment connected thereto located in the different longitudinal sections of said main bus.

21. An electrical distribution system including longitudinally extending main supply busses divided into separate longitudinal sections, generators for supplying current to said sections, bus tie switches controlling the communication between different sections of said longitudinal bus, bus tie reactors, switches for including the latter in circuit with said bus, and a multiplicity of group busses with distribution equipment connected thereto located in the different longitudinal sections of said main bus, a switch house along which the separate longitudinal sections of the bus extend, said house being formed with rooms extending transversely of the main bus for housing the group busses and isolating the equipment thereof from the main supply busses and the switching equipment of the latter.

22. An electrical distribution system including longitudinally extending main supply busses divided into separate longitudinal sections, generators for supplying current to said sections, bus tie switches controlling the communication between different sections of said longitudinal bus, bus tie reactors, switches for including the latter in circuit with said bus, and a multiplicity of group busses with distribution equipment connected thereto located in the different longitudinal sections of said main bus, said group busses extending substantially at right angles to the main supply busses so that a maximum number of pieces of distribution equipment can be served by a minimum length of main supply bus.

In witness whereof, we have hereunto signed our names.

THOMAS E. MURRAY.
ROBERT BAKER.